(12) United States Patent
Kakimoto et al.

(10) Patent No.: US 6,751,648 B2
(45) Date of Patent: Jun. 15, 2004

(54) SYSTEM FOR SHARING IMAGE INPUT DEVICE ON NETWORK

(75) Inventors: Atsushi Kakimoto, Yokohama (JP); Masashi Kuroshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/410,095

(22) Filed: Oct. 1, 1999

(65) Prior Publication Data

US 2003/0204607 A1 Oct. 30, 2003

(30) Foreign Application Priority Data

Oct. 6, 1998 (JP) .......................................... 10-284111
Oct. 6, 1998 (JP) .......................................... 10-284114

(51) Int. Cl.⁷ .............................................. G06F 15/16
(52) U.S. Cl. ....................... 709/203; 709/219; 709/223
(58) Field of Search ................................ 709/200, 203, 709/215, 217, 321, 329, 219, 223, 225, 226

(56) References Cited

U.S. PATENT DOCUMENTS

| | | | | |
|---|---|---|---|---|
| 5,845,076 A | * | 12/1998 | Arakawa | 709/203 |
| 5,850,573 A | | 12/1998 | Wada | 395/882 |
| 5,911,044 A | * | 6/1999 | Lo et al. | 709/203 |
| 6,115,739 A | * | 9/2000 | Ogawa et al. | 358/1.15 |
| 6,256,662 B1 | * | 7/2001 | Lo et al. | 709/203 |

FOREIGN PATENT DOCUMENTS

| | | |
|---|---|---|
| EP | 0 679 014 A2 | 10/1995 |
| JP | 10-275223 | 10/1998 |

OTHER PUBLICATIONS

Patent Abstracts of Japan, vol. 016, No. 357 (P–1395), Jul. 31, 1992 (JP 04 109368).
Patent Abstracts of Japan, vol. 016, No. 330 (P–1338), Jul. 17, 1992 (JP 04 097495).
Patent Abstracts of Japan, vol. 016, No. 330 (P–1388) Jul. 17, 1992 (JP 04 097468).
Patent Abstracts of Japan, vol. 1998, No. 14, Dec. 31, 1998 (JP 10 232925).

* cited by examiner

*Primary Examiner*—David Wiley
*Assistant Examiner*—Phuoc Nguyen
(74) *Attorney, Agent, or Firm*—Fitzpatrick, Cella, Harper & Scinto

(57) ABSTRACT

It is an object of this invention to allow a user to perform operations while he or she is unconscious of the types of interfaces of various image input devices on a network.

An image input server device on a network is searched for, device control information of an image input device locally connected to the found image input server is obtained from the server, and virtual device information based on a universal image in-out interface is generated from the obtained device control information. An image reading session is executed in collaboration with the image input server device by using the virtual device information and information of communication with the image input server device.

An image input server device to which an image input device is locally connected receives a session request from a client on a network and determines the type of requesting client from the session request.

Different image reading sessions are executed when the determination result indicates that the requesting client is a dedicated client and that the requesting client is a universal client.

16 Claims, 12 Drawing Sheets

FIG.4

| NETWORK CONNECTION INFORMATION | CONNECTING DESTINATION INFORMATION | 401 |
| | IMAGE INPUT DEVICE NETWORK NAME | 402 |
| | SECURITY AUTHORIZATION INFORMATION | 403 |
| | OTHER NETWORK CONNECTION INFORMATION | 404 |
| DEVICE IDENTIFIER INFORMATION | DEVICE NAME | 405 |
| | MODULE VERSION INFORMATION | 406 |
| | CREATOR'S NAME | 407 |
| | OTHER IDENTIFYING INFORMATION | 408 |
| DEVICE FUNCTION INFORMATION | FIRST FUNCTION INFORMATION | FUNCTION IDENTIFIER | 409 |
| | | DATA FORMAT IDENTIFIER | 410 |
| | | ACTUAL DATA | 411 |
| | ⋮ | |
| | nTH FUNCTION INFORMATION | FUNCTION IDENTIFIER | 412 |
| | | DATA FORMAT IDENTIFIER | 413 |
| | | ACTUAL IDENTIFIER | 414 |

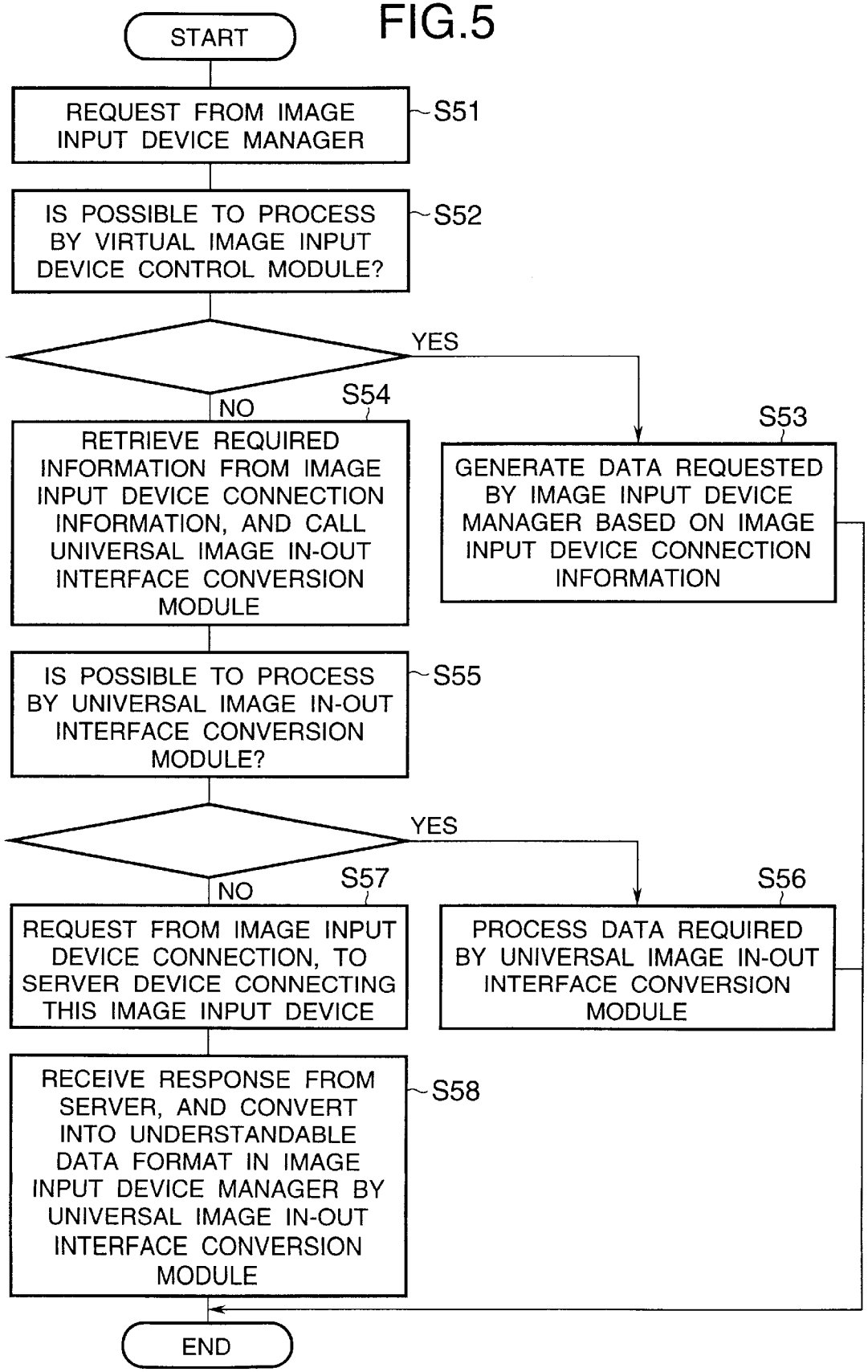

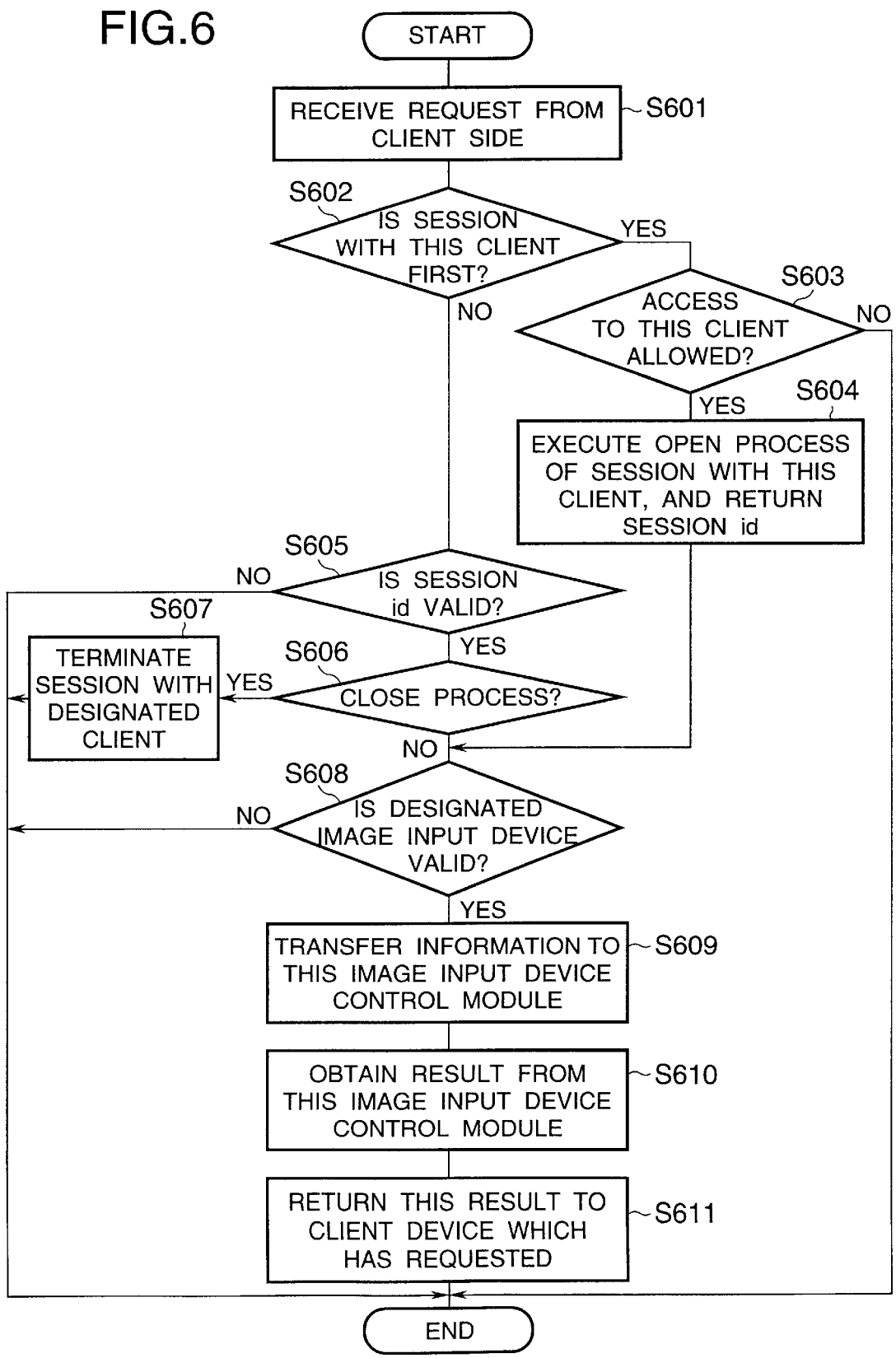

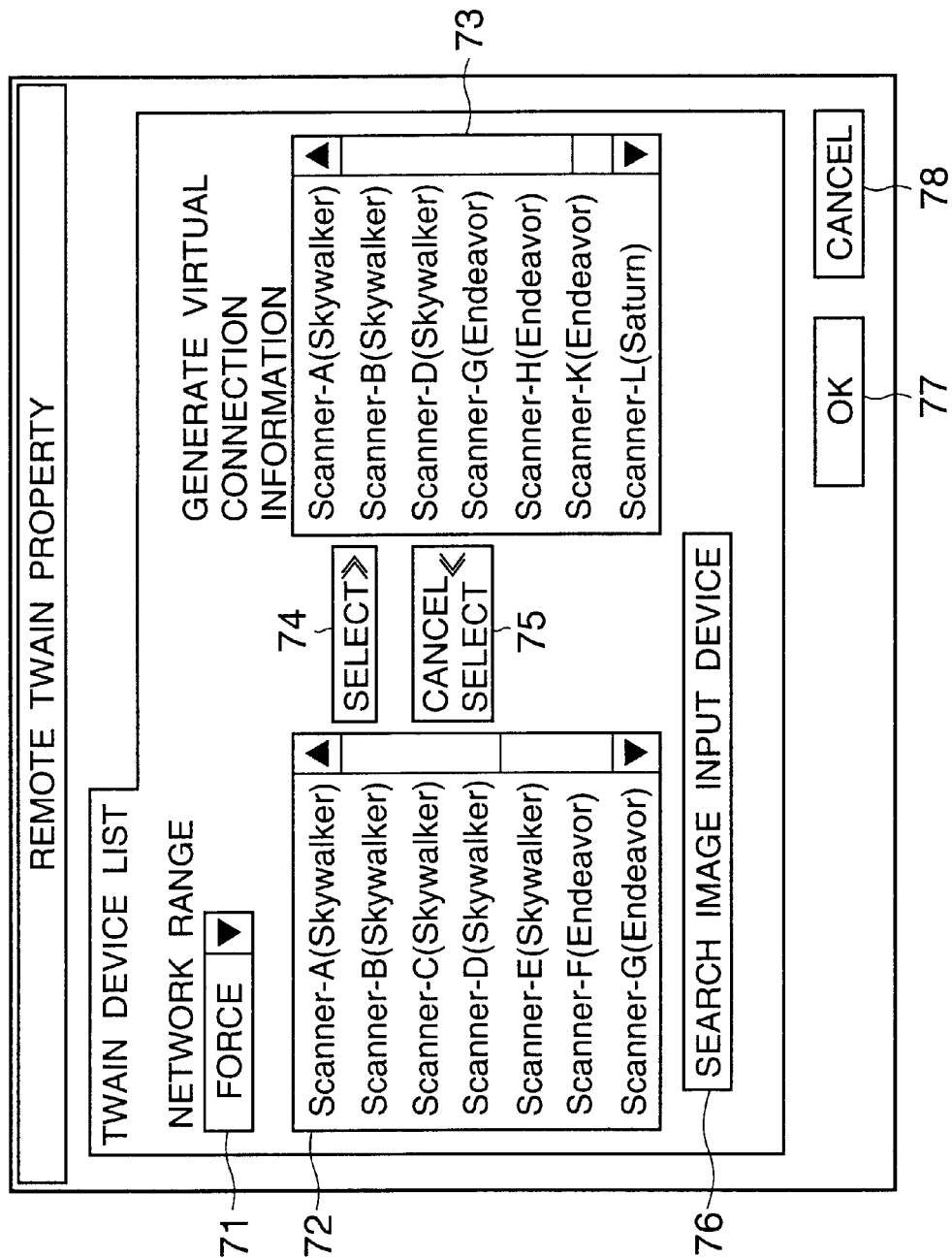

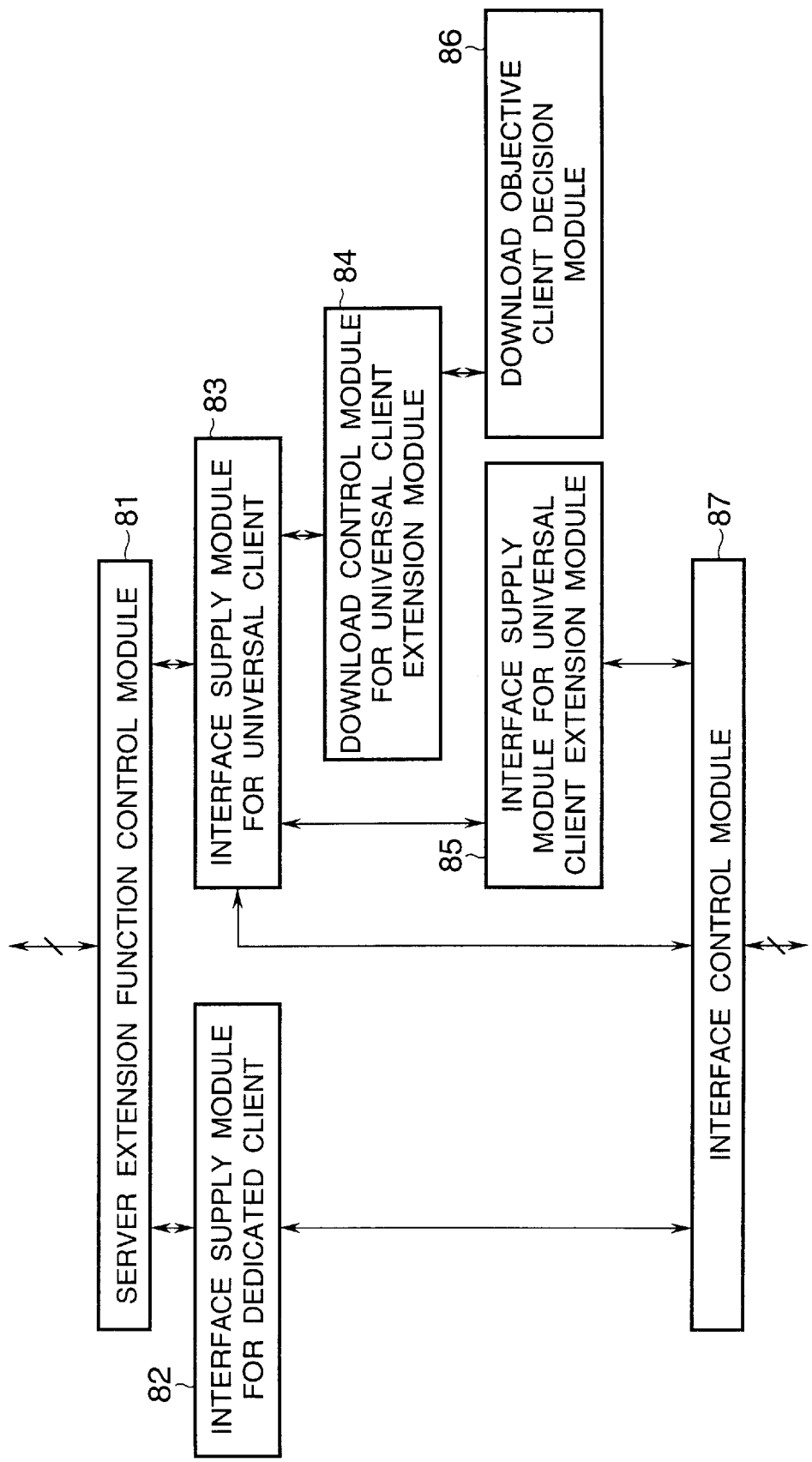

SYSTEM FOR SHARING IMAGE INPUT DEVICE ON NETWORK

BACKGROUND OF THE INVENTION

1. Field of the Invention

The present invention relates to a system for sharing an image input device on a network and, more particularly, to a system capable of using an image input device regardless of the type of interface to the image input device.

2. Related Background Art

Conventionally, a system for sharing peripheral devices such as printers on a network such as a LAN has been realized. Such system has certain advantages: the cost can be reduced by sharing the peripheral devices on the network and the space for installing these devices can also be minimized.

In a system like this, however, it is impossible to share an image input device such as a scanner on a network and control the device by using a universal image in-out interface.

Since a universal in-out interface cannot control an image input device on a network, the user on the client device side who wishes to use the image input device must go to an apparatus to which the image input device is connected, directly operate on the apparatus, and store the obtained image data in a desired location.

Alternatively, the user starts a dedicated client application not corresponding to a universal image in-out interface to acquire an image via the network and opens another desired image editing application to edit the image data.

As described above, in either case the user must temporarily stop the work that he or she is currently executing in order to load an image from the network.

SUMMARY OF THE INVENTION

The present invention has been made to solve the above problems, and has as its object to share an image input device such as a scanner on a network and control the image input device by using a universal image in-out interface.

It is another object of the present invention to allow a user to perform operations while he or she is unconscious of the types of interfaces of various image input devices on a network.

It is still another object of the present invention to reduce the load on a network when a user uses an image input device on the network.

It is still another object of the present invention to properly extend functions of a client device using an image input device.

To achieve the above objects, an image input server device on a network is searched for, device control information of an image input device locally connected to the found image input server is obtained from the server, and virtual device information based on a universal image in-out interface is generated from the obtained device control information. An image reading session is executed in collaboration with the image input server device by using the virtual device information and information of communication with the image input server device.

An image input server device to which an image input device is locally connected receives a session request from a client on a network and determines the type of requesting client from the session request.

Different image reading sessions are executed when the determination result indicates that the requesting client is a dedicated client and that the requesting client is a universal client.

Other objects of the present invention will become apparent from the following detailed description taken in conjunction with the accompanying drawings.

BRIEF DESCRIPTION OF THE DRAWINGS

FIG. 4 is a view showing the data structure of image input device connection information;

FIG. 5 is a flow chart showing processing when a virtual image input device control module 39 is requested to access an image input device on a network;

FIG. 6 is a flow chart showing processing when the client device sends a request to an image input device connected to a server device;

FIG. 7 is a view showing an example of a virtual image reading device connection setting screen;

FIG. 8 is a view showing the arrangement of functions in a server extension module 22 in the second embodiment;

DETAILED DESCRIPTION OF THE PREFERRED EMBODIMENTS

Embodiments of the present invention will be described in detail below.

Figure 1:
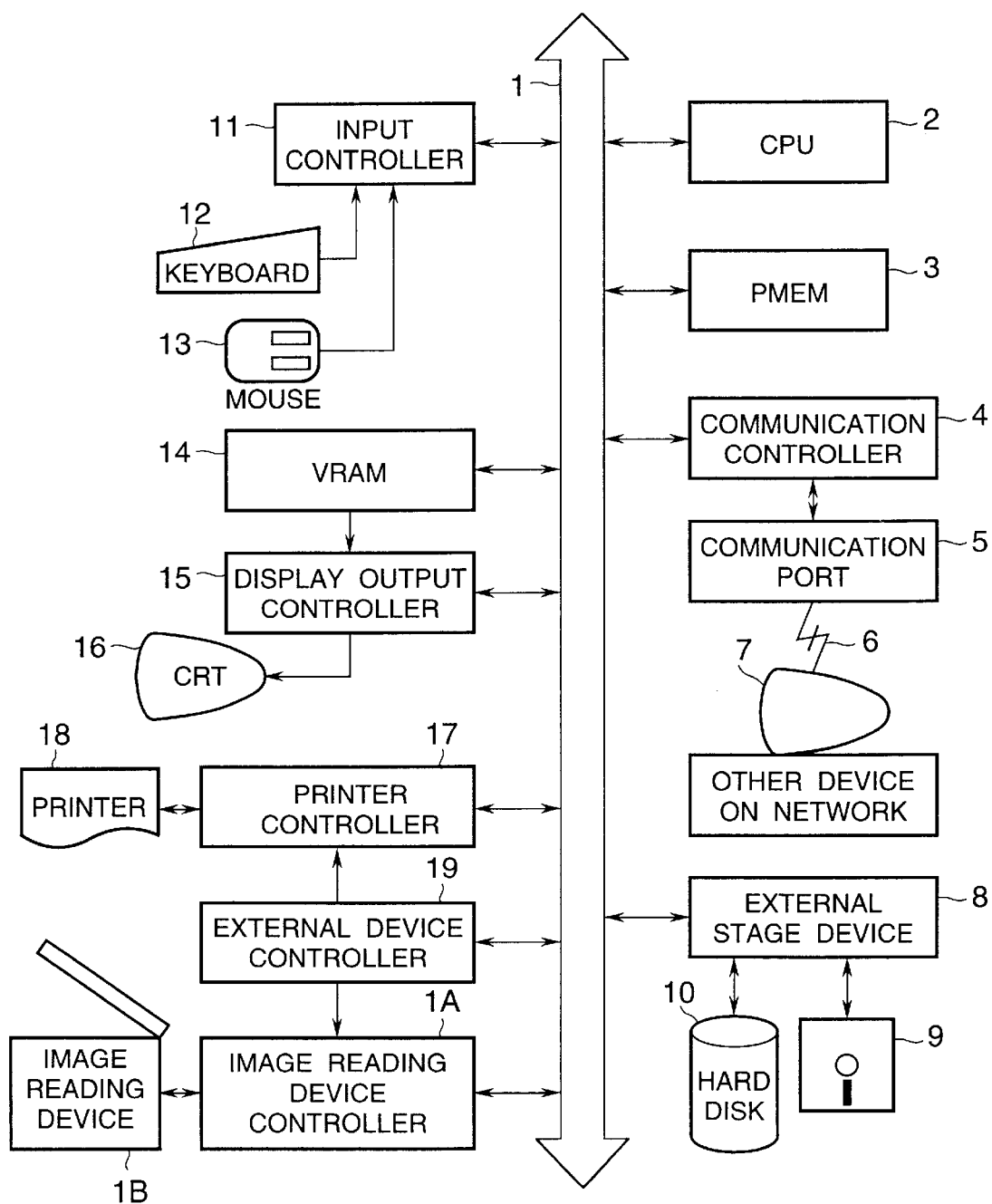
FIG. 1 is a block diagram showing the arrangement of an information processing apparatus in the first embodiment.

FIG. 1 is a block diagram showing the arrangement of an information processing apparatus of one embodiment according to the present invention. A system bus 1 is connected to individual building blocks to be described below. A program memory (to be referred to as a PMEM hereinafter) 3 selects and loads a relevant program from a hard disk 10, and a CPU (Central Processing Unit) 2 executes the program. Input data from a keyboard 12 is stored as code information in the PMEM which is also a text memory. A communication controller 4 controls in-out data at a communication port 5. An output signal from the communication port 5 is transmitted to a communication port of an other device 7 on a network via a communication line 6. Data exchange with an image output device such as a printer and an image input device such as a scanner shared on the network is performed via the communication controller 4.

In this embodiment, a network such as a LAN will be described as this communication line 6. However, the present invention is, of course, applicable when the communication port and the communication channel connected to this communication controller are a general public port and channel.

The apparatus also includes an external storage device 8 and disks 9 and 10 for data files, e.g., a floppy disk (to be referred to as an FD hereinafter) 9 and a hard disk (to be referred to as an HD hereinafter) 10.

An input controller 11 is connected to input devices such as the keyboard 12 and a mouse 13. An operator operates the keyboard 12 and the mouse 13 to input operation commands to the system. In this embodiment, this mouse 13 is a pointing device (to be referred to as a PD hereinafter) for designating processing of image information on a CRT 16. An operator uses this mouse 13 to freely move the cursor on the CRT 16 in the X and Y directions to select a command icon on a command menu and designate processing and also designate an object to be edited and a drawing position.

The apparatus further includes a video image memory (to be referred to as a VRAM hereinafter) 14, a display output controller 15, and the CRT 16. Data displayed on the CRT 16 is mapped as bit map data on the VRAM.

A printer controller 17 controls data output from a printer 18 connected thereto, and receives information from an external device controller 19.

An image input device controller 1A controls an image input device 1B connected thereto, and also receives information from the external device controller 19. These constituent elements 1A and 1B are essential components in an image input server device of this embodiment. However, they are not essential in a client device because, as described previously, the client device can use the same constituent elements shared by the server via the communication controller 4 and the communication port 5.

Furthermore, assume that the arrangement shown in FIG. 1 has the same functions regardless of whether the image input device and the image input device controller are physically discrete components or a single component contains both the image input device and the image input device controller.

<First Embodiment>

Figure 2:
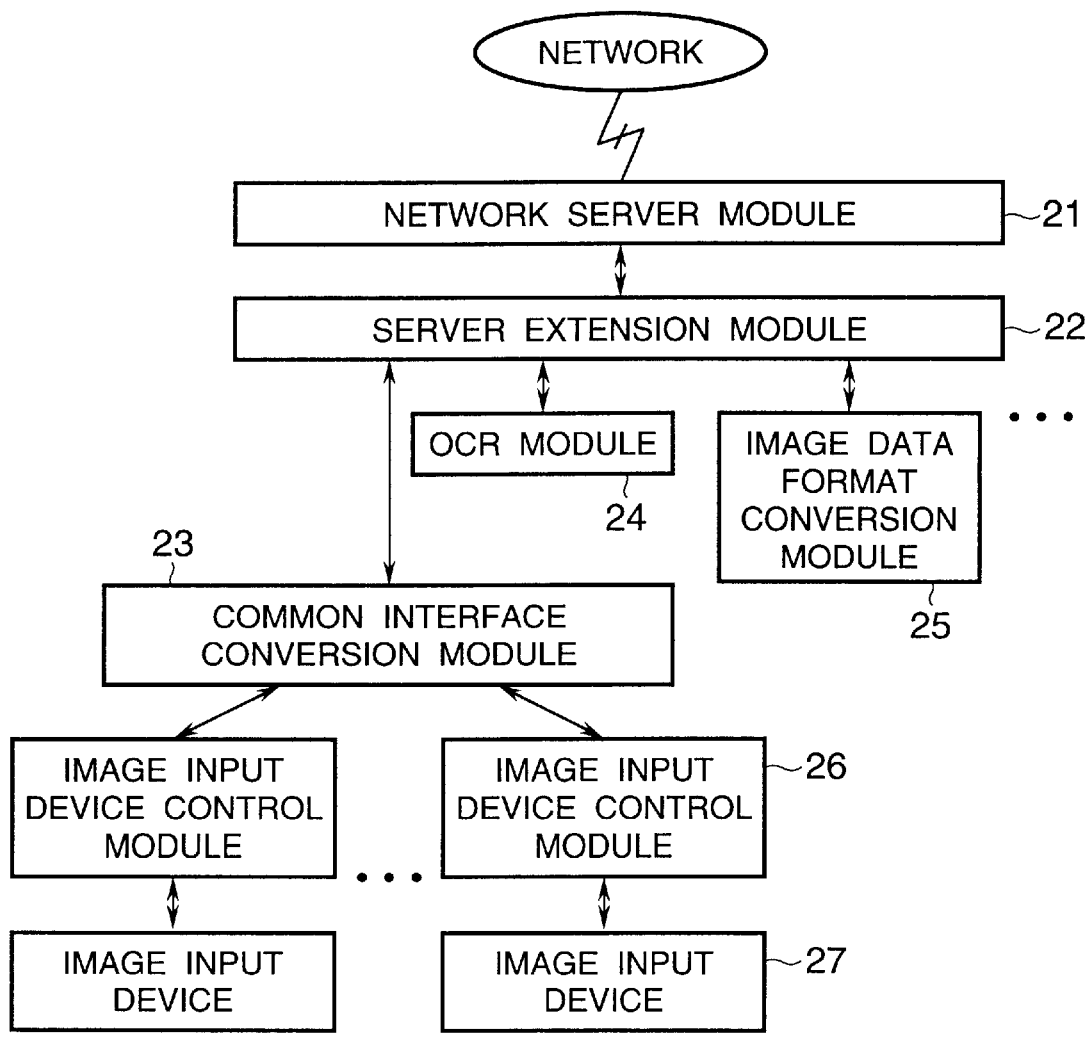
FIG. 2 is a view showing the arrangement of functions in an image input server device.

FIG. 2 shows the arrangement of functions in an image input server device of this embodiment.

Referring to FIG. 2, a network server module 21 converts data obtained by a server extension function (to be described later) into a data format exchangeable on a network corresponding to a universal network protocol.

Also, the network server module 21 converts network data transmitted from a client into an internal data format interpretable by a server extension module.

A server extension module 22 analyzes data transferred from the server, selects a designated one from a plurality of image service modules under the management of this module, and provides the service of the selected module. The server extension module 22 also transfers data from a certain service module to another service module (e.g., calls an image in-out control module from an OCR module).

When the server extension module requests the service of any image input device, a common interface conversion module 23 converts the request data into a control instruction corresponding to a designated input device control module 26. The common interface conversion module 23 also has a function of converting unique control information of a device from the input device control module into a general interface which can be transferred to the server extension module. More specifically, the former is image reading parameter setting information from a client, and the latter is image information and its attached information obtained as a result of reading designation.

An OCR module 24 is called when a client requests conversion from image data read by an image input device into document data. An image data format conversion module 25 converts the format of image data obtained from an image input device into an image data format designated by a client.

The input device control module 26 controls individual image input devices 27 in accordance with their respective properties. That is, the input device control module 26 inputs and outputs control instructions/information corresponding to (specialized to) the individual devices.

Figure 3:
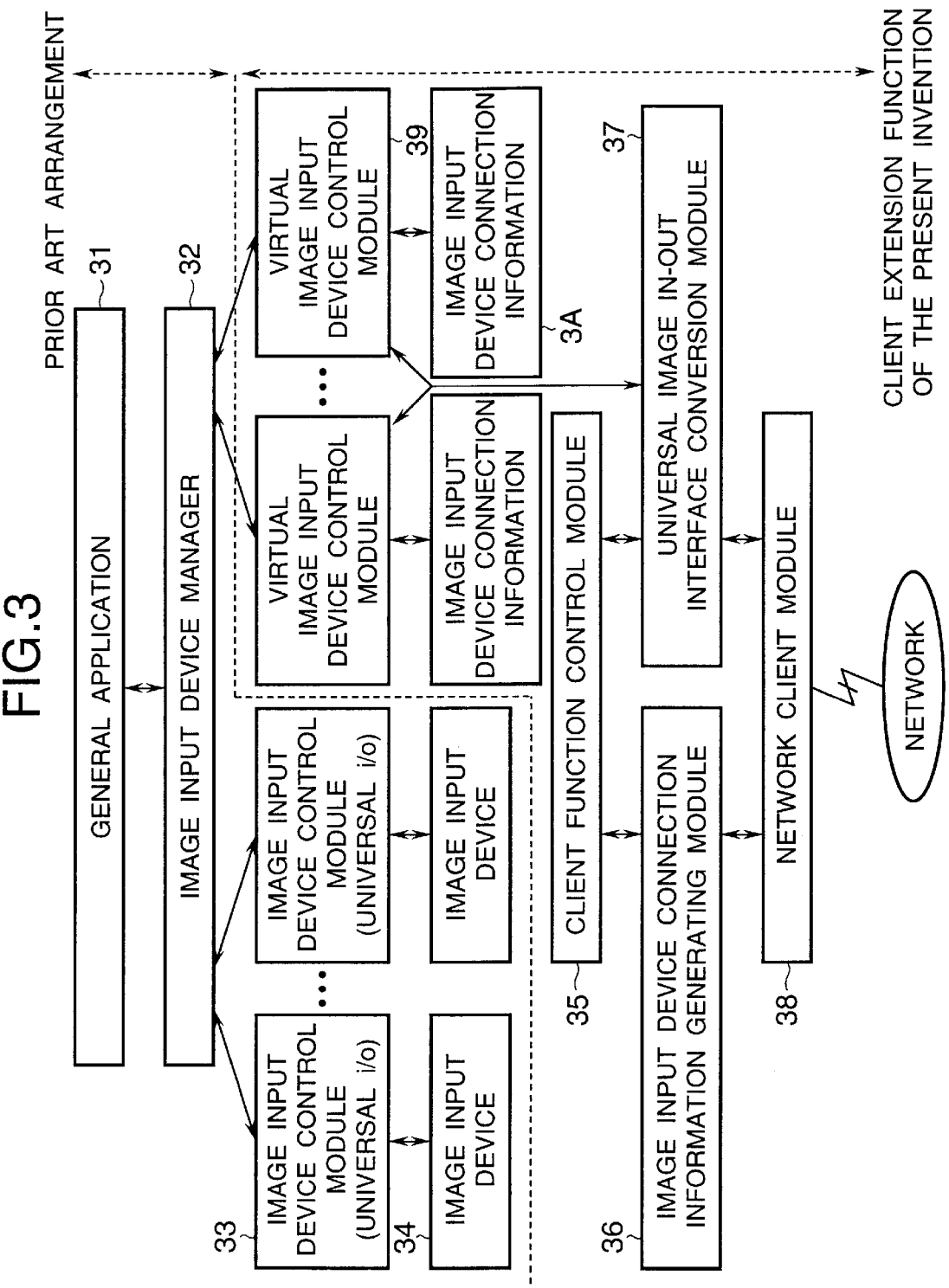
FIG. 3 is a view showing a setting screen of an image input device in a client device.

FIG. 3 shows the arrangement of functions in an image input client device of this embodiment.

Referring to FIG. 3, the apparatus requires an image input device connection information generating module 36.

Components 31 to 34 in FIG. 3 are necessary for a general application to access a locally connected image input device. A client extension function in this embodiment includes components 35 to 3A.

A general application 31 has an image input function. An image input device manager 32 provides this application with a universal image in-out interface. In accordance with designation from the in-out interface, this manager exchanges information with the designated one of image input device control modules under the management of the interface.

Image input device control modules 33 have a universal i/o. These modules control image input devices individually connected by the universal interface that is determined between these modules and the image input manager 32. Unlike the image input device control module 26 described above, this module provides a universal interface. That is, functionally each module is a combination of an image input device control module 26, a common interface conversion module 23, and a universal image in-out interface conversion module 37. The image input device manager 32 is, e.g., a TWAIN manager, and the image input device control modules 33 are equivalent to TWAIN drivers corresponding to the individual devices.

Individual image input devices 34 are locally connected to this apparatus.

Element items constructing client extension functions in the present invention will be described below.

A client function control module 35 controls all modules constructing individual client extension functions to be described below.

An image input device connection information generating module 36 acquires attribute information of an image input device connected to a server device, which is obtained using a network client module 38, and information necessary for network connection, and generates each image input device control information 3A.

At the same time, a virtual image input device control module 39 is automatically generated. When this module is generated, the image input device manager 32 can handle a device on the network as if it were virtually connected.

The universal image in-out interface conversion module 37 converts control information for an image input device on the server side, which is obtained using the network client module 38, into a universal interface corresponding to the image input manager 32.

This module provides the image input manager 32 with these interface functions not directly, but via individual virtual image input device control modules as will be described later.

The network client module 38 converts data into a data format exchangeable on a network corresponding to a universal network protocol so that the above modules and the server module can communicate with each other.

The virtual image input device control modules 39 are generated in one-to-one correspondence with set image input devices on the network. This module basically performs only intermediate processing; e.g., the module returns information of the corresponding image input device connection information 3A or transfers the information to the universal image in-out interface providing conversion module 37 and transfers the result to the image input manager 32.

As described above, the universal image in-out interface conversion module performs most of actual processing, so the module 39 can be a small module. Accordingly, the overhead can also be small even when these modules are generated for image input devices on a plurality of networks.

FIG. 4 shows the data structure of the image input device connection information shown in FIG. 3. Referring to FIG. 4, areas 401 to 404 indicate pieces of network connection information of the corresponding image input device.

The area 401 stores information for identifying a connecting destination server on the network, i.e., a machine name on the network or a network address.

The area 402 stores the network name of an image input device shared on the network, which is used to identify the device. The area 403 stores security authorization information for obtaining use authorization, when security limitations are set for the use of the device. This information is, e.g., a password for obtaining use authorization.

The area 404 stores other information necessary for network connection.

Areas 405 to 408 indicate pieces of identifying information of the device, which are used to provide virtual device information to the aforementioned image input device manager. These pieces of information are loaded from the server device and stored in these areas.

The area 405 stores name information of the device. The area 406 stores version information of a module. The area 407 stores information about the creator's name of the module. The area 408 stores other identifying information. Areas 409 to 414 indicate pieces of function information of the device. In this embodiment, n pieces of function information exist, and the areas 409 to 411 and the areas 412 to 414 respectively indicate sets of these pieces of function information.

The function information herein mentioned indicates the capability of the corresponding device, e.g., corresponding size information of a loading area or a list of loading resolutions.

The area 409 stores a function identifier. The area 410 stores a data format identifier. This information is used to identify whether the format of function information is a certain value, a value in a certain range, or a list form (1, 5, 10, 15).

The area 411 stores actual function information in accordance with the data format. The areas 412 to 414 store the nth function information in the same form.

FIG. 5 shows a flow chart of internal processing on the client side when the image input device manager sends, to the virtual image input device control module, a request of access to an image input device on the network. The procedure of this flow chart is realized by the CPU 2 by executing a program stored in the PMEM 3.

First, in step S51, the image input manager sends a request to the virtual image input device control module via the universal interface.

In step S52, the CPU 2 checks whether it is possible to process the request by the virtual image input device control module.

The virtual image input device control module can acquire static device control information such as device identifying information without inquiring of the image input device via the network. Therefore, the CPU 2 determines that it is possible to process the request.

To acquire image data, on the other hand, it is necessary to give an instruction to the image input device, so the CPU 2 determines that the request is impossible to process. This eliminates unnecessary use of the network and thereby reduces the load on the network.

If the CPU 2 determines in step S52 that it is possible to process the request, the flow branches to step S53; if not, the flow branches to step S54. In step S53, the CPU 2 generates data requested in this module by using the image input device connection information.

In step S54, the CPU 2 reads out necessary information from the image input device connection information and calls the universal image in-out interface conversion module.

In step S55, the CPU 2 checks whether it is possible to process the request by the universal image in-out interface conversion module.

That is, settings of, e.g., some attributes of the device are done only by settings in this module, and pieces of information set to this point are collectively transmitted to the server when it is actually necessary to access the network. This increases the efficiency.

If the CPU 2 determines in step S55 that it is possible to process the request in this module, the flow branches to step S56; if not, the flow branches to step S57.

In step S56, the CPU 2 processes the data required by the universal image in-out interface conversion module. In step S57, the CPU 2 sends a request from the image input device connection information to the server device on the network to which the corresponding image input device is connected.

If a response for the request sent to the server in the preceding step is received, in step S58 the CPU 2 converts the response into an understandable (universal) data format in the image input device manager by the universal image in-out interface conversion module.

By any of the above processes, the image input device manager can obtain desired return information.

FIG. 6 shows a flow chart of internal processing on the server side when the client device sends a request to an image input device connected to the server device.

First, in step S601 the CPU 2 receives a request from the client side via the network.

In step S602, the CPU 2 checks whether the request from this client is a session for the first time.

If the request is from a client that has already started a session, session id (identifying information) is added to the data obtained in step S601.

If the CPU 2 determines in step S602 that the request is the first session, the flow branches to step S603; if not, the flow branches to step S605.

In step S603, the CPU 2 checks whether this server device allows access to the requesting client. If access is allowed, the flow branches to step S604; if not, the CPU 2 sends access reject information to the client.

In step S604, the CPU 2 opens a session between the requesting client and the server and returns session id as a consequence. This session id is valid until the client side sends a close request or the server process in the server device is completed. The server can naturally establish sessions with a plurality of clients at the same time.

If the request is from a client with which a session is already open, in step S605 the CPU 2 checks whether the session id designated to the server is valid. If the CPU 2 determines in step S605 that the session id is valid, the flow branches to step S606; if not, the CPU 2 returns information indicating that the session is invalid.

In step S606, the CPU 2 checks whether the request from the client is a session close process. If YES in step S606, the flow branches to step S607; if NO in step S606, the flow branches to step S608.

In step S607, the CPU 2 executes the session close process with the designated client, and the flow proceeds on to a termination process.

In step S608, the CPU 2 checks whether the image input device designated by the client is valid. If YES in step S608, the flow branches to step S609; if NO in step S608, the CPU 2 returns information indicating that the device is an invalid printer to the client, and executes a termination process.

In step S609, the CPU 2 transfers the request information from the client to an image input device control module corresponding to this image input device. In step S610, the CPU 2 obtains return information from this image input device control module.

In step S611, the CPU 2 informs the client side of the result obtained in the preceding step via the network.

FIG. 7 shows an example of a virtual image reading device connection setting screen for realizing the functions of this embodiment.

By operation from the setting screen shown in FIG. 7, virtual connection information is generated only for an image input device desired by the user.

Referring to FIG. 7, an area 71 is used to designate a network range, e.g., a domain, for searching for an image input device shared on the network. A list 72 shows image input devices found in this network range. In this embodiment, the sharing names of these image input devices are displayed in this list, and the network names of server devices to which these input devices are connected are described in parentheses. A list 73 shows image input devices for which virtual connection information is formed. The image input devices displayed in the list 73 are displayed in a device list as if they are image input devices directly connected to the client device. At the same time, actual image reading can be designated. A control button 74 is used to designate addition of virtual connection setting. When an operator selects a device from the list 72 and presses the button 74 by using a pointing device or the like, the selected device is added to the list 73. A control button 75 is used to designate deletion from the list. When deletion is designated, virtual connection information of the corresponding device is deleted. This makes the device unusable from the client device.

A control button 76 is used to designate image input device search in the designated network. A control button 77 is used to designate termination by reflecting the settings in this dialogue. A control button 78 is used to designate termination by canceling the settings.

<Second Embodiment>

In the second embodiment, an image input server device performs an image reading session by using an interface corresponding to the type of client.

FIG. 8 shows the arrangement of various functions in a server extension module 22.

A server extension function control module 81 controls all modules constructing the server extension module. This module 81 collectively interfaces with external devices, determines the type of requesting client, and calls a lower-order module having the corresponding function.

An interface supply module 82 for dedicated client supplies an image input device control interface to a dedicated client module corresponding to this server device.

An interface supply module 83 for universal client supplies an image input device control interface to a universal client application.

The difference between functions supplied by the interface supply module 82 for dedicated client and the interface supply module 83 for universal client is that the former, including an original function supplied by a server device in the present invention, can be used on the client module side, whereas the latter is limited to a function supplied as an interface interpretable by a universal application. As an example, when a universal application is an Internet browser, the interface supplied by the latter can exchange data by using a form function.

A universal client extension module exists to eliminate the function limitations on a universal client application as described above. This module can operate on a universal client application to extend the user interface and, as a consequence, allow detailed functions supplied by the server device to be used.

A download control module 84 for universal client extension module checks whether this universal client extension module exists on the client side or not, and downloads and incorporates the module if the universal client extension module does not exist.

As described above, when the universal client extension module is downloaded to the client side, the extended interface must be supplied. An interface supply module 85 for universal client extension module performs this processing.

A download objective client decision module 86 supplies, to a requesting client, a function of checking whether the client extension module can be downloaded. As a means for this check, it is possible to use information of a user who is currently logging on to the requesting client or a password requested when a user accesses the server.

When any of these high-order modules accesses a low-order image device control module, an interface control module 87 supplies a unified interface.

Figure 9:
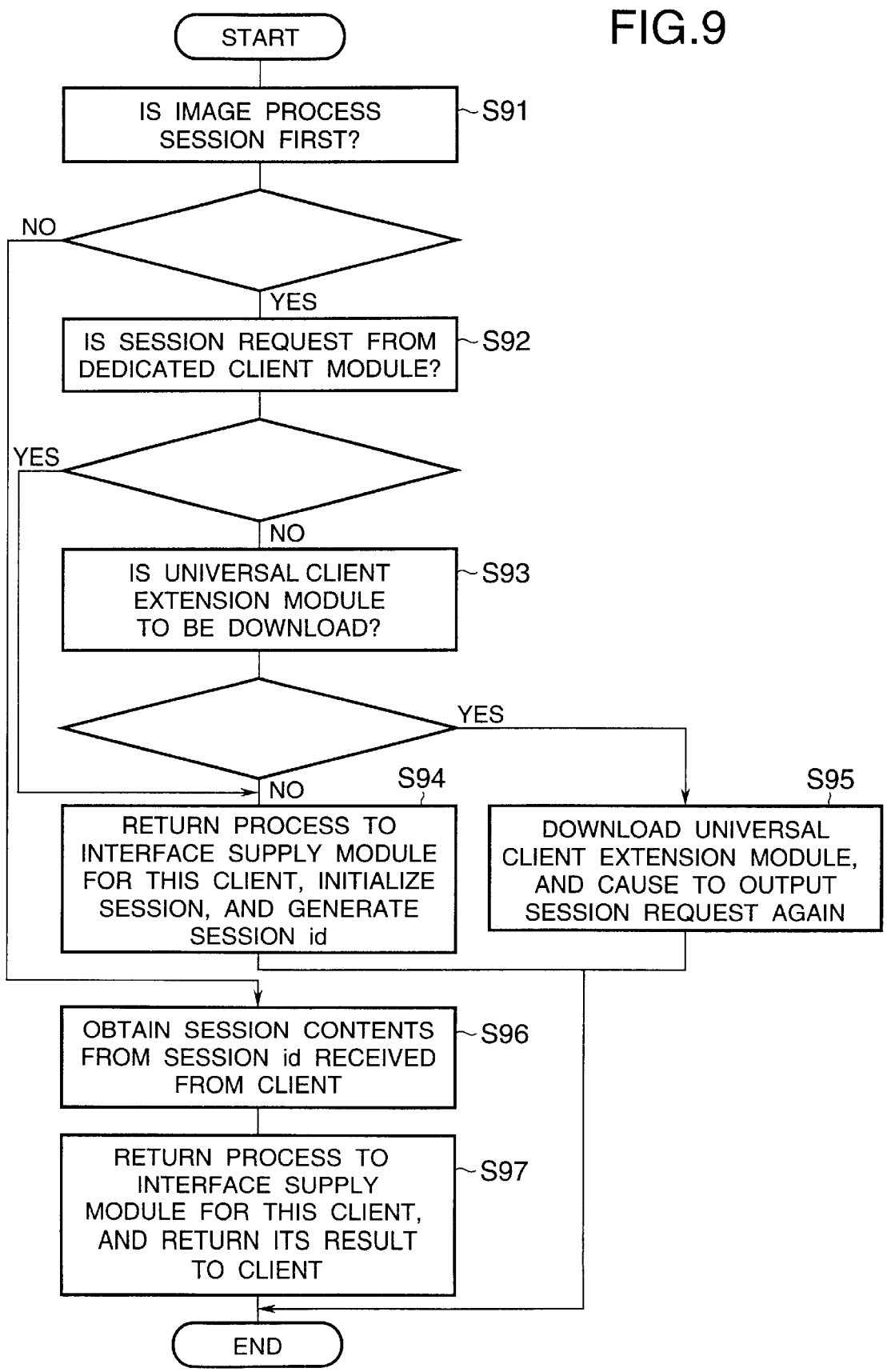
FIG. 9 is a flow chart showing processing when a client device sends a processing request to the server module 22.

FIG. 9 shows a flow chart of an example of the flow of processing when a client device sends a processing request to the server extension module 22.

First, in step S91 whether the request from this client is the first image process session is checked. This is done by checking whether session id (to be described later) is added as request information from the client side.

If a session id is added, this session has been established previously. If the session is the first one, the flow branches to step S96; if not, the flow branches to step S92.

"Session" herein mentioned is information for holding request information when a specific client requests a specific shared image input device on the server side.

In step S92, whether this session request is from a dedicated client module is checked.

This can be done by checking client identifying information present in the session request information. For example, when HTTP sends a session request, identifying information can be informed as a query parameter to be transferred to an object on the basis of the well-known Universal Resource Identifier (URI) format.

If it is determined in step S92 that the access is from a dedicated client module, the flow branches to step S94; if not, the flow branches to step S93.

In step S93, whether the universal client extension module is to be downloaded to the universal client application is checked.

This function is realized by checking the right of the client that has requested the access by using the download objective client decision module 86.

If it is determined in step S93 that the module is not to be downloaded, the flow branches to step S94. If it is determined in step S93 that the client has the download right, the flow branches to step S95.

In step S94, in accordance with the type of requesting client the requested session is initialized by transferring the processing to an appropriate module from the interface supply module for dedicated client and the interface supply module for universal client, and session id for identifying the session is generated. After that, this session information is valid until a client sends a session termination request, and is managed by the server side on the basis of the session id. After this step, the flow advances to a termination process.

In step S95, the universal client extension module is downloaded to the requesting client, the session is once terminated to allow the client to install the module, and the client is caused to output a session request again.

Since this session is already open, in step S96 the session information is obtained from the session id, and the flow advances to step S97.

In step S97, on the basis of the session information the request for the designated image input device is transferred to and processed by the interface supply module for this client, and the result is returned to the requesting client via this module to terminate the processing.

Figure 10:
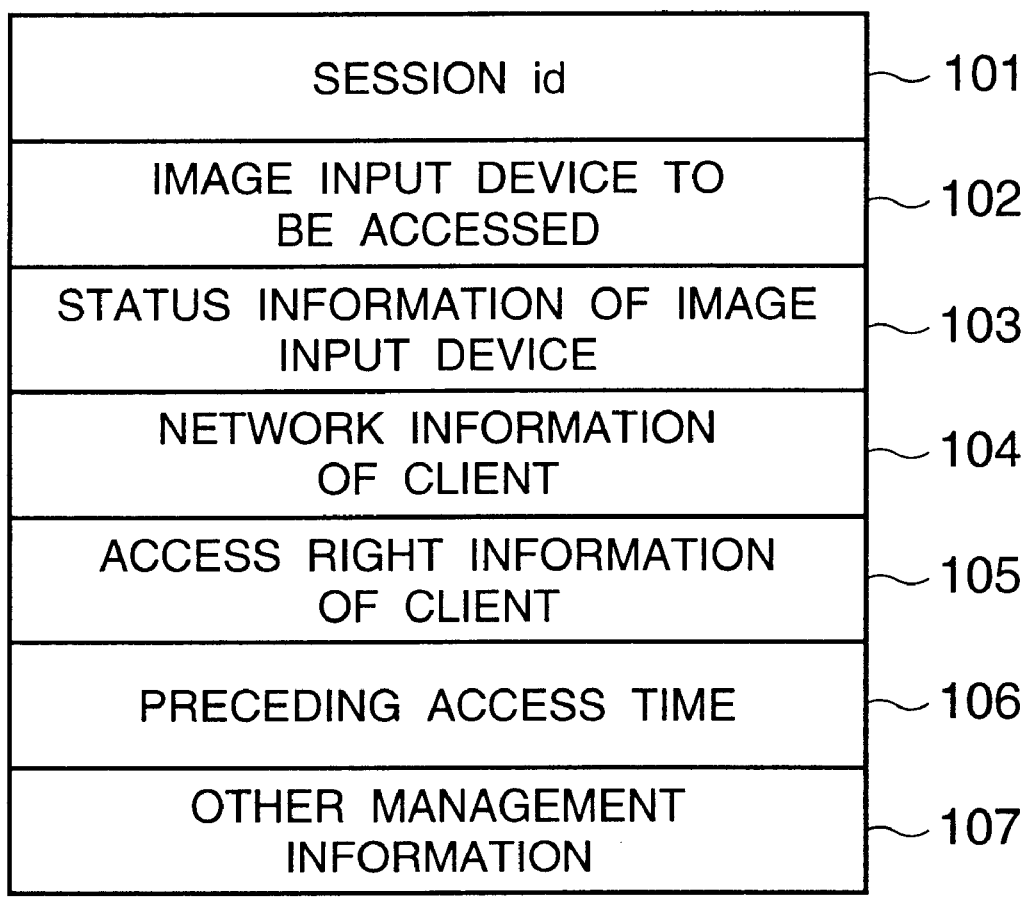
FIG. 10 is a view showing the structure of session management information from a client to an image input device shared on a network in the second embodiment.

FIG. 10 shows an example of the structure of management information of a session from a client to an image input device shared on the network.

Session id 101 is uniquely set to identify a desired one from a plurality of data.

Information 102 is used to identify an image input device which a client requests to access.

An area 103 stores information indicating the present status of the image input device as a result of setting information designated by sessions so far.

Identifying information 104 is used to identify the requesting client on the network.

Information 105 is used to identify the access right of the requesting client.

Time stamp information 106 is used to record the time the session is used last.

If the server device determines on the basis of this information that the recorded client has not accessed for a predetermined time or more from the last session, the server device deletes this session information by regarding this session as invalid. The purpose of this function is to prevent a specific client from occupying a shared image input device for long time periods without any access for long time.

An area 107 stores management information other than those described above.

Figure 11:
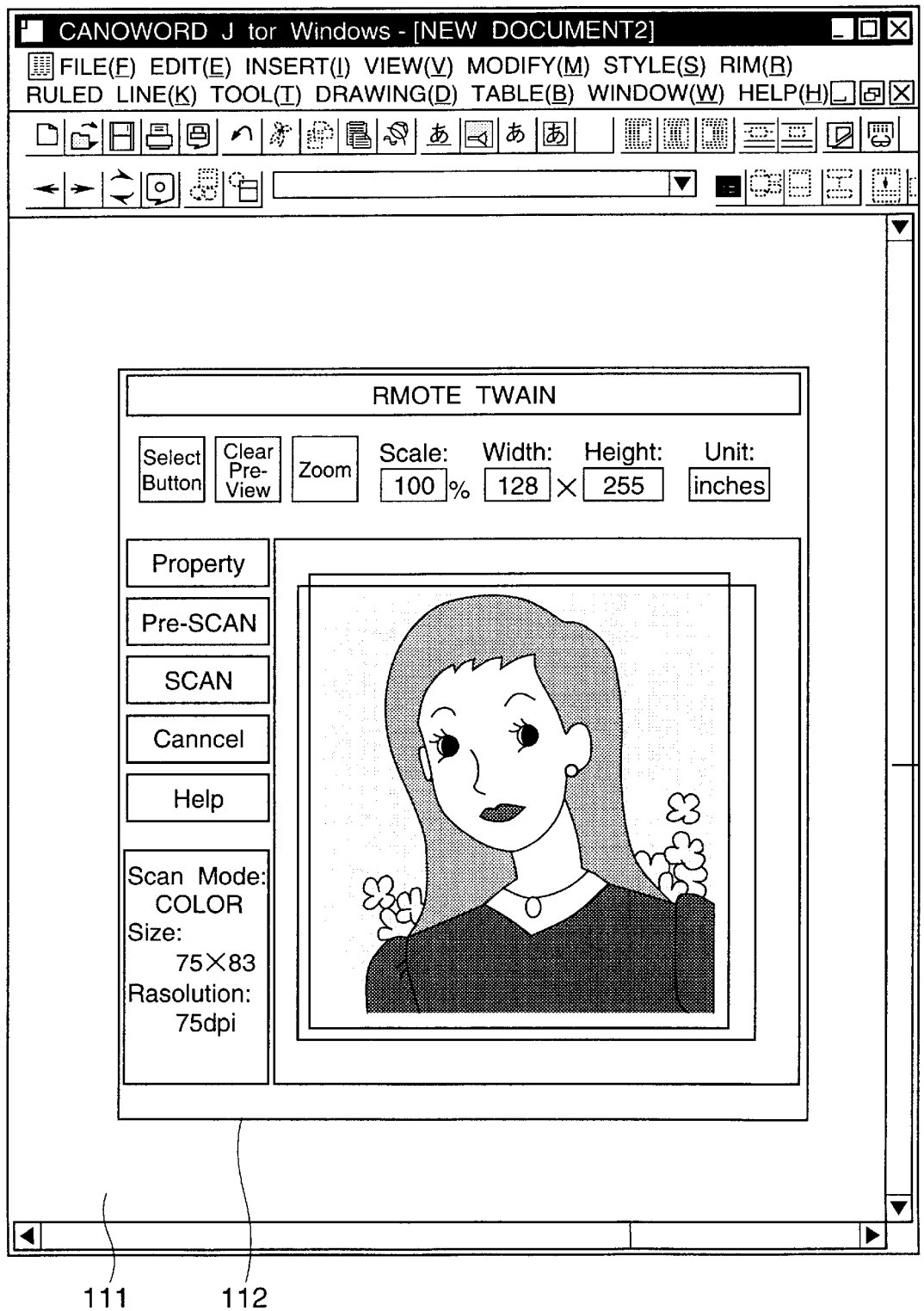
FIG. 11 is a view showing a display example when a client function extension module is incorporated into a universal client application in the second embodiment.

FIG. 11 shows a display example when the client function extension module is incorporated into a universal client application.

This screen contains a universal client application display area 111 and an interface function 112 displayed by the client extension module and capable of designating an image input parameter.

A user can perform fine input settings for image input by designating desired control in this area by using a keyboard or a pointing device.

Figure 12:
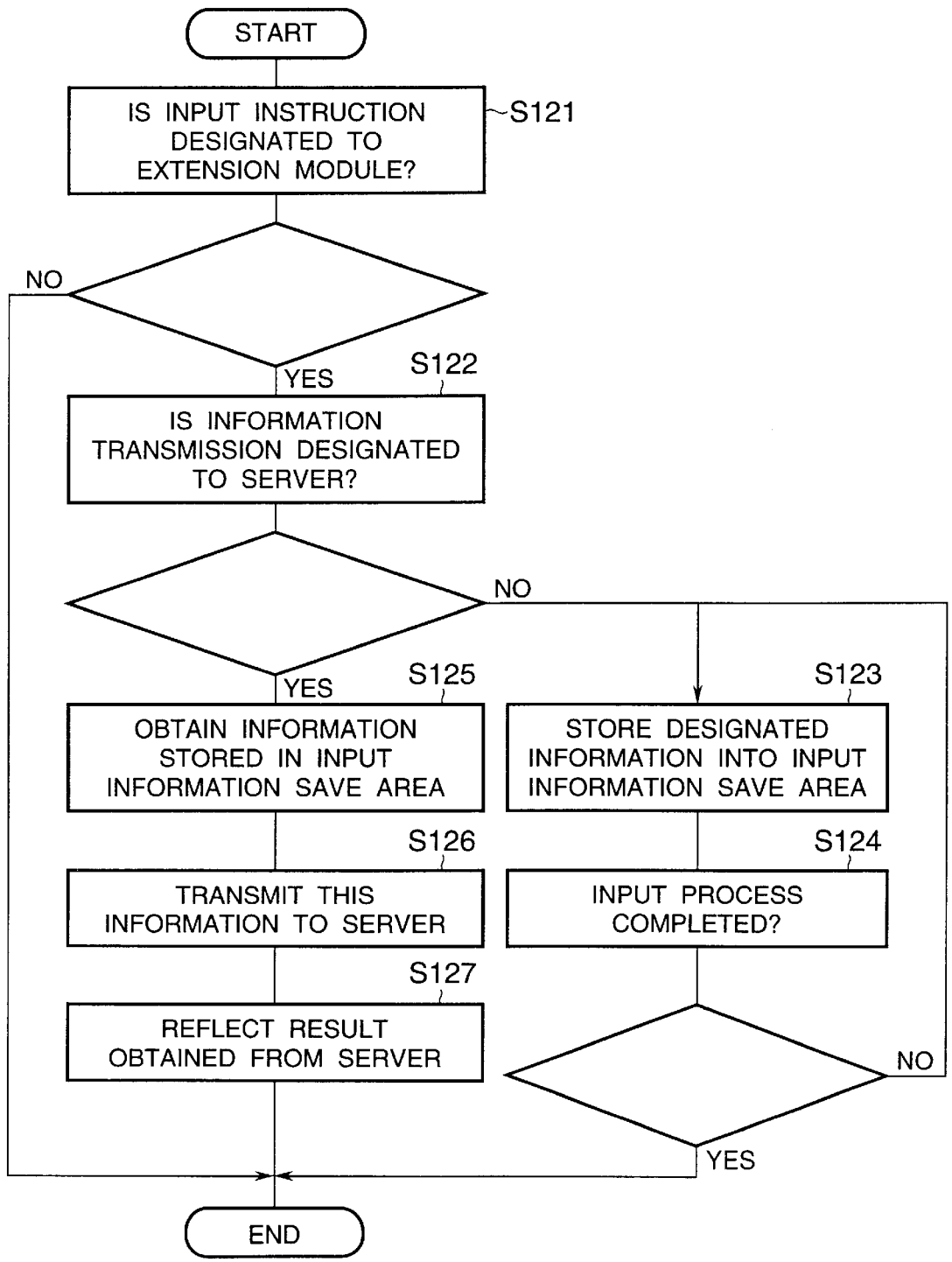
FIG. 12 is a flow chart showing internal processing when the client extension module is incorporated into the universal client application.

FIG. 12 shows a flow chart of internal processing when the client extension module is incorporated into a universal client application and the user sets image input parameters.

In step S121, whether the input from the user is designated to this extension module or the universal client application is checked.

If it is determined in step S121 that the input is designated to the extension module, the flow branches to step S122; if not, the flow advances to a termination process (hereinafter a termination process is not processing by the extension module but is transfer of processing to a universal application).

In step S122, whether the designated contents indicate that information needs to be transmitted to the server is checked. If YES in step S122, the flow branches to step S125; if NO in step S122, the flow branches to step S123.

In step S123, the input is processed only on the client side. That is, the client side performs some processing in accordance with the user's designation. Alternatively, the designated information is stored in an input information storage area set on the client side, so that the information can be transmitted to the server side at a later timing.

In step S124, whether this user input process is completed is checked. If it is determined in step S124 that the input state is continuing, the flow branches to step S124; if not, this process is completed, and the flow prepares for next input.

In step S125, the pieces of information stored in the input information storage area are obtained.

In step S126, the obtained pieces of information are collectively transmitted to the server.

In step S127, information obtained from the server as a result of step S126 is reflected on display in this module, and the processing is completed.

In the first embodiment as described above, it is possible to share image input devices on a network and control these image input devices from the client side by using a universal image in-out interface. This allows a user to be unconscious of whether a desired image input device exists on the network or is directly locally connected.

Consequently, the user on the client device side can use an image input device shared on the network without interrupting the work that he or she is currently performing.

Also, on the basis of information of an image input device existing on the network, virtual image input device connection information corresponding to a universal image in-out interface is automatically generated in a client device. Accordingly, the user on the client side can add a virtual device without installing individual connection information.

The load on the network can be reduced by properly using virtual image input device connection information in image reading sessions.

Furthermore, a desired one of a plurality of image input server devices existing in a network is selected, and virtual image input device connection information is generated only for the selected device. Since no wasteful input information is generated on the client device side, it is possible by providing this function to increase the processing efficiency and save the occupied area of the information.

In the second embodiment, an image input device is shared on a network, and a dedicated client module for supplying a universal image in-out interface to the image input device exists on the client device side, or a universal client application corresponding to a universal network protocol exists on the client device side. In either case, the user on the client side can use the image input device on the network by using one of these modules without interrupting the work that he or she is currently performing.

Additionally, the user on the client side can effectively use an image input device on the network by downloading an image reading designation extension function from the server device.

Furthermore, when the client side sends a download request for the module, whether the download is to be permitted is checked. With this function it is possible to set the security protection function.

The above embodiments can be applied to a case where programs are supplied to a system or an apparatus. In this case, the objects of the present invention are achieved by reading out and executing program codes stored in a storage medium to achieve the present invention by a computer (CPU or MPU) of the system or the apparatus.

The present invention also includes a case where a module provided by an OS (Operating System) running on the computer executes part of the processing when the computer executes the readout program codes.

The present invention is not limited to the above embodiments, and various modifications of the invention can be made.

What is claimed is:

1. An information processing apparatus connected to a network, comprising:
    connecting means for locally connecting to an image input device;
    control means for controlling the image input device;
    server means for executing an image reading session in collaboration with said control means, in response to a session request sent from a client device on the network; and
    determining means for determining a type of a client module of the client device that sent the session request,
    wherein said server means includes:
        server extension function control means for communicating with one or more client devices on the network and for controlling operations of said server means;
        universal interface means for providing an interface to a universal client application;
        download means for downloading to the client device a universal client extension module, which extends one or more functions of the universal client application; and
        client interface means for providing an interface to a dedicated client module,
    wherein said server means executes an image reading session based on a determination result from said determining means, and
    wherein the extension module includes user interface information for operating the image input device.

2. An apparatus according to claim 1, wherein said server means determines whether the extension module is to be downloaded by checking whether the client device has the extension module.

3. An apparatus according to claim 1, wherein said server means determines whether the extension module is to be downloaded based on an access right of the client device.

4. A system comprising a plurality of client devices and an image input server device connected via a network, wherein
    a client device of said plurality of client devices comprises:
        client means for sending an image reading session request to said image input server device, and
        converting means for converting communication information of said image input server device into communication information of a universal image in-out interface; and
    said image input server device comprises:
        connecting means for locally connecting to an image input device,
        control means for controlling the image input device,
        server means for executing an image reading session in collaboration with said control means, in response to a session request sent from a client device on the network, and
        determining means for determining a type of a client module of the client device that sent the session request,
    wherein said server means includes:
        server extension function control means for communicating with the plurality of client devices and for controlling operations of said server means;
        universal interface means for providing an interface to a universal client application;
        download means for downloading to the client device a universal client extension module, which extends one or more functions of the universal client application; and
        client interface means for providing an interface to a dedicated client module,
    wherein said server means executes an image reading session based on a determination result from said determining means, and
    wherein the extension module includes user interface information for operating the image input device.

5. A system according to claim 4, wherein said server means determines whether the extension module is to be downloaded by checking whether said client device has the extension module.

6. A system according to claim 4, wherein said server means determines whether the extension module is to be downloaded based on an access right of said client device.

7. A system according to claim 4, wherein the client module is a TWAIN interface.

8. A method of sharing a locally connected image input device on a network, comprising the steps of:
    providing a server for communicating with one or more client devices on the network, wherein the server includes:
        universal interface means for providing an interface to a universal client application;
        download means for downloading to the client device a universal client extension module, which extends one or more functions of the universal client application; and
        client interface means for providing an interface to a dedicated client module,
    receiving a session request sent from a client device on the network;
    determining a type of a client module of the client device that sent the received session request; and
    executing an image reading session, based on a determination result in said determining step, by controlling the image input device, and
    wherein the extension module includes user interface information for operating the image input device.

9. A method according to claim 8, wherein whether the extension module is to be downloaded is determined by checking whether the client device has the extension module.

10. A method according to claim 8, wherein whether the extension module is to be downloaded is determined based on an access right of the client device.

11. A method according to claim 8, wherein the client module is a TWAIN.

12. A method of using an image input device locally connected to an image input server on a network, comprising the steps of:

in a client device on the network,
- sending an image reading session request to the image input server device, and
- converting communication information of the image input server device into communication information of a universal image in-out interface; and in the image input server device,
- receiving the session request sent from the client device,
- determining a type of a client module of the client device that sent the received session request,
- executing an image reading session, based on a determination result in said determining step, by controlling the image input device,
- providing an interface to a universal client application,
- downloading to the client device a universal client extension module, which extends one or more functions of the universal client application, and
- providing an interface to a dedicated client module, wherein the image input server includes server extension function control means for communicating with one or more client devices on the network, and wherein the extension module includes user interface information for operating the image input device.

13. A method according to claim 12, wherein, when the determination result indicates that the client module is a universal client module, an extension module for extending a function of the universal client module is downloaded to the client device.

14. A method according to claim 12, wherein whether the extension module is to be downloaded is determined by checking whether the client device has the extension module.

15. A method according to claim 12, wherein whether the extension module is to be downloaded is determined based on an access right of the client device.

16. A method according to claim 13, wherein the universal client module is a TWAIN interface.

* * * * *

UNITED STATES PATENT AND TRADEMARK OFFICE
CERTIFICATE OF CORRECTION

| | |
|---|---|
| PATENT NO. | : 6,751,648 B2 |
| APPLICATION NO. | : 09/410095 |
| DATED | : June 15, 2004 |
| INVENTOR(S) | : Atsushi Kakimoto et al. |

It is certified that error appears in the above-identified patent and that said Letters Patent is hereby corrected as shown below:

[*] NOTICE

Insert: --* This patent issued on a continued prosecution application filed under 37 CFR 1.53(d), and is subject to the twenty year patent term provisions of 35 U.S.C. 154(a)(2).--.

COLUMN 12

Line 67, "TWAIN." should read --TWAIN interface--.

Signed and Sealed this

Fifteenth Day of August, 2006

JON W. DUDAS
*Director of the United States Patent and Trademark Office*